(12) United States Patent
Pourhashem et al.

(10) Patent No.: US 10,745,569 B2
(45) Date of Patent: Aug. 18, 2020

(54) ANTI-CORROSION NANOCOMPOSITE COATING

(71) Applicants: Sepideh Pourhashem, Karaj (IR); Ali Morad Rashidi, Tehran (IR); Mohammad Reza Vaezi Jezeh, Tehran (IR)

(72) Inventors: Sepideh Pourhashem, Karaj (IR); Ali Morad Rashidi, Tehran (IR); Mohammad Reza Vaezi Jezeh, Tehran (IR)

(*) Notice: Subject to any disclaimer, the term of this patent is extended or adjusted under 35 U.S.C. 154(b) by 71 days.

(21) Appl. No.: 15/789,891

(22) Filed: Oct. 20, 2017

(65) Prior Publication Data

US 2018/0057696 A1 Mar. 1, 2018

Related U.S. Application Data

(60) Provisional application No. 62/411,615, filed on Oct. 23, 2016.

(51) Int. Cl.
| | |
|---|---|
| *C08K 3/04* | (2006.01) |
| *C09D 5/08* | (2006.01) |
| *C09D 163/00* | (2006.01) |
| *B05D 1/02* | (2006.01) |
| *C08J 3/20* | (2006.01) |
| *C09D 7/40* | (2018.01) |
| *C09D 7/61* | (2018.01) |

(52) U.S. Cl.
CPC ............... *C09D 5/086* (2013.01); *B05D 1/02* (2013.01); *C08J 3/203* (2013.01); *C09D 5/08* (2013.01); *C09D 7/61* (2018.01); *C09D 7/67* (2018.01); *C09D 163/00* (2013.01); *C08J 2363/00* (2013.01); *C08J 2477/00* (2013.01); *C08K 3/04* (2013.01); *C08K 3/042* (2017.05)

(58) Field of Classification Search
CPC ........ C09D 5/086; C09D 163/00; C08K 3/04; C08K 3/042
See application file for complete search history.

(56) References Cited

U.S. PATENT DOCUMENTS

| | | | |
|---|---|---|---|
| 7,479,516 B2 | 1/2009 | Chen et al. | |
| 8,871,838 B1 | 10/2014 | Bahattab et al. | |
| 2009/0073349 A1* | 3/2009 | Park | B82Y 10/00 349/69 |
| 2009/0087792 A1* | 4/2009 | Iizumi | H05B 33/10 430/312 |
| 2016/0024310 A1 | 1/2016 | McMullin et al. | |
| 2016/0340553 A1* | 11/2016 | Eckert | B32B 27/08 |
| 2017/0137601 A1* | 5/2017 | Heikkinen | C08G 77/14 |
| 2017/0321116 A1* | 11/2017 | Satake | G02B 5/12 |
| 2018/0208835 A1* | 7/2018 | Armstrong | C07C 319/18 |
| 2018/0215997 A1* | 8/2018 | Zhao | C09K 11/08 |
| 2018/0312747 A1* | 11/2018 | Chakraborty | C09K 11/02 |

FOREIGN PATENT DOCUMENTS

| | | |
|---|---|---|
| CN | 101735724 A | 6/2010 |
| CN | 104963022 A | 10/2015 |
| WO | 2016025051 A2 | 2/2016 |

OTHER PUBLICATIONS

Biplab Ghosh, Bio-based waterborne polyurethane/carbon dot nanocomposite as a surface coating material, Progress in Organic Coatings, Jun. 2015, vol. 90, pp. 324-330.
Mohammad BinSabt, Hydrothermally Modified PVA/ZnS-NCQDs Nanocoating for Stainless Steel Corrosion Protection in Saline Water, Royal Society of Chemistry, Dec. 2015, Issue 9, 2016.
Jiheng Ding, Study on Modification of Lignin as Dispersant of Aqueous Graphene Suspension and Corrosion Performance in Waterborne G/Epoxy Coating, International Journal of Advanced Engineering Research and Science, Sep. 2016, vol. 3, Issue 9.
Zhiyi Zhang, Mechanical and Anticorrosive Properties of Graphene/Epoxy Resin Composites Coating Prepared by in-Situ Method, International Journal of Molecular Sciences, Dec. 2014, vol. 16, Issue 1, pp. 2239-2251.
Lin Gu, Facile Preparation of Water-dispersible Graphene Sheets Stabilized by Carboxylated Oligoanilines and their Anticorrosion Coatings, ACS Applied Materials & Interfaces, Jul. 2015, vol. 7, Issue 32, Pagers 17641-17648.
Jui-Ming Yeh, Siloxane-modified epoxy resin—clay nanocomposite coatings with advanced anticorrosive properties prepared by a solution dispersion approach, Surface and Coatings Technology, Jan. 2006, vol. 200, Issue 8, pp. 2753-2763.
Tao Su, Preparation of Electricity Conductive Anticorrosion Coatings for Grounding Grid, International Conference on Advances in Energy and Environmental Science, 2015.
Huige Wei, Anticorrosive conductive polyurethane multiwalled carbon nanotube nanocomposites, J. Mater. Chem. A, 2013, 1, pp. 10805-10813.
Mengting Mo, Excellent tribological and anti-corrosion performance of polyurethane composite coatings reinforced with functionalized graphene and graphene oxide nanosheets, Royal Society of Chemistry, Jun. 2015, Issue 70, pp. 56486-56497.
Rui Dong, Preparation and properties of acrylic resin coating modified by functional graphene oxide, Applied Surface Science, Jan. 2016, vol. 368, pp. 378-387.
M.R. Bagherzadeh, Preparation of epoxy—clay nanocomposite and investigation on its anti-corrosive behavior in epoxy coating, Progress in Organic Coatings, Sep. 2007, vol. 60, Issue 2, pp. 117-120.
N. Bahrami Panah, Synthesis and study of corrosion performance of epoxy coating containing julti-walled carbon nanotube / poly ortho aminophenol nanocomposite, Iranian Journal of Materials Science & Engineering, vol. 13, No. 1, Mar. 2016, pp. 1-10.

\* cited by examiner

*Primary Examiner* — Margaret G Moore
(74) *Attorney, Agent, or Firm* — Bajwa IP Law Firm; Haris Zaheer Bajwa

(57) ABSTRACT

An anti-corrosion coating and a method for fabricating the anti-corrosion coating is disclosed. The coating includes a polymer, a curing agent, and quantum dots. The method includes adding carbon quantum dots to a polymer coating as a nanofiller to enhance the corrosion resistance properties of the polymer coating. The coating is configured to provide improved anti-corrosion properties at a lower cost.

8 Claims, 11 Drawing Sheets

ANTI-CORROSION NANOCOMPOSITE COATING

CROSS-REFERENCE TO RELATED APPLICATION

This application claims the benefit of priority from U.S. Provisional Patent Application Ser. No. 62/411,615, filed on Oct. 23, 2016, and entitled "CORROSION RESISTANT NANOCOMPOSITE COATINGS CONTAINING CARBON DOTS," which is incorporated herein by reference in its entirety.

TECHNICAL FIELD

The present disclosure generally relates to anti-corrosion coatings and particularly to a nanocomposite anti-corrosion coating, and more particularly to a nanocomposite anti-corrosion coating containing quantum dots.

BACKGROUND

Corrosion may be defined as a natural process that occurs between a material and its surrounding environment. The process converts the material to a more chemically-stable form, such as an oxide, hydroxide, or sulfide of the material. However, corrosion may degrade the useful properties of a material or structure, including effects on strength, appearance and permeability to liquids and gases.

Thus, corrosion of metals is a significant and destructive process, resulting in economic losses across a wide range of industries. As an example, metals used in industrial structures may be oxidized and corroded due to exposure to harsh environmental conditions such as marine environment and moisture, which may subsequently lead to a deterioration of the mechanical properties of the structures. Therefore, corrosion may result in financial damages, with major impact on the economics of industries. It can be understood that the field of corrosion protection may play an important role in a wide range of industries such as oil and gas, petrochemical, and marine industries in order to help provide long-lasting structures.

Generally, conventional corrosion prevention methods have been based on eliminating or suppressing the chemical reactions which result in corrosion of materials. For purposes of reference, corrosion prevention methods may be divided in three different categories, though they may be combined: (a) cathodic protection; (b) corrosion resistant coatings, and (c) inhibitors. The most commonly used method for preventing corrosion of metals is application of a corrosion resistant coating on a metal substrate to prevent contact between the corrosive medium and the metal substrate. While conventional coating compounds often offer corrosion protection properties, they are associated with issues such as short service life, toxicity, high production cost, and instability.

Another group of anti-corrosion coatings that have been widely employed for corrosion protection of metallic structures in various industries is organic coating. For example, organic coatings may generally refer to epoxies, polyurethanes, silicones, alkyds, and other resins and polymers, which protect the metal by imposing a physical barrier between the metal surface and the corrosive environment. The barrier protection of organic coatings may occur by impeding the transport of aggressive agents through low permeable coatings to the surface of the substrate.

However, the applications of organic coatings may be restricted due to their inherent properties. For example, these organic coatings can have low resistance against penetration of corrosive agents such as water, oxygen, and ions, leading to disbondment of the coating at the metal/coating interface, which further leads to corrosion of the metal. Therefore, to overcome the aforementioned issues, carbon-based materials with a high specific surface area, such as carbon nanotubes, carbon black, and graphene may be used as nanofillers in order to enhance the mechanical properties and corrosion resistance of organic coatings.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure is directed to a method of fabricating an anti-corrosion coating. The method includes the steps of synthesizing quantum dots, and adding the synthesized quantum dots to a polymer.

The above general aspect may include one or more of the following features. In one example, the method can also include functionalizing the quantum dots. In some implementations, the quantum dots may be selected from the group consisting of carbon quantum dots, graphene quantum dots, polymer quantum dots and combinations thereof. In other implementations, the polymer can be selected from the group consisting of vinyl polymers, condensation polymers, chain-growth polymers, step-growth polymers, polyacrylamides, polyacrylates, polystyrene, polybutadiene, polyacrylonitrile, polysaccharides, polyacrylic acid, polyesters, polyamides, polyurethanes, polyimides, nylons, polyvinyl alcohol, polyethylene oxide, polypropylene oxides, polyethylene glycol, poly(ethylene terephthalate), poly(methyl methacrylate), epoxies, acrylics, silicones and combinations thereof. In some cases, functionalizing the quantum dots can also include dissolving the quantum dots in deionized water to obtain a first solution, adding the first solution to a solution containing a functionalizing agent to obtain a second solution, refluxing the second solution to obtain a refluxed solution, and drying the refluxed solution to obtain functionalized quantum dots. In some implementations, the functionalizing agent may be selected from the group consisting of silanes, polyaniline, organic materials with amine end-groups and isocyanate end-groups, and combinations thereof. In another example, the functionalizing agent can be a silane selected from the group consisting of 3-aminopropyl triethoxysilane, 3-aminopropyl trimethoxysilane, 3-glycidiloxypropyl trimethoxysilane, and bis[3(triethoxysilyl)propyl] tetra sulfide. In some cases, synthesizing the quantum dots may include preparing a first solution by dispersing carbon black in a $HNO_3$ solution, refluxing the first solution, evaporating or vaporizing the $HNO_3$ solution, thereby obtaining black sediments, preparing a second solution by dispersing the black sediments in deionized water, and drying the second solution, thereby obtaining carbon dots. As another example, synthesizing the quantum dots can include preparing a primary solution by dissolving citric acid and urea in deionized water, heating the primary solution in an autoclave, thereby obtaining a carbon dot solution, and drying the carbon dot solution, thereby obtaining carbon dots. In another example, adding the synthesized quantum dots to the polymer may involve mixing the polymer with quantum dots to obtain a quantum dots polymer mixture, and adding hardener to the quantum dots polymer mixture. As another example, adding the synthesized quantum dots to the polymer may include mixing the quantum dots with a hardener to obtain a quantum dots hardener mixture, and adding the quantum dots hardener mixture to a polymer. In some cases, adding the synthesized quantum dots to the polymer can include preparing a first solution by dispersing the quantum dots in an organic solvent, preparing a second solution by adding the first solution to a curing agent, preparing a third solution by adding the second solution to a stoichiometric amount of epoxy resin, and spray coating the third solution on a substrate, thereby obtaining a coated substrate. Furthermore, an anti-corrosion coating can be manufactured by the method described herein and applied to various substrates.

In another general aspect, the present disclosure is directed to an anti-corrosion coating that includes a polymer, a curing agent, and quantum dots.

The above general aspect may include one or more of the following features. In one example, the polymer can be selected from the group consisting of epoxy, polyurethane, acrylics, silicones, rubbers, and combinations thereof. In one implementation, the curing agent may be polyamide. In another example, the quantum dots can be selected from the group consisting of carbon quantum dots, graphene quantum dots, polymer quantum dots and combinations thereof. In some cases, the quantum dots may be functionalized with a functionalization agent to obtain enhanced dispersion of the quantum dots in the polymer. In some implementations, the functionalization agent is selected from the group consisting of silane groups such as 3-aminopropyl triethoxysilane, 3-aminopropyl trimethoxysilane, 3-glycidiloxypropyl trimethoxysilane, bis [3(triethoxysilyl) propyl] tetra sulfide, polyaniline, organic structures such as materials with amine end-groups and isocyanate end-groups, and combinations thereof. In one implementation, the concentration of the quantum dots is in the range of 0.001% weight percent to 10% weight percent. Furthermore, in some implementations, a method of protecting a substrate from corrosion can involve applying the anti-corrosion coating disclosed herein to an exterior surface of the substrate.

Other systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the following claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The follow disclosure describes a method for fabricating an anti-corrosion coating, by adding carbon quantum dots to a polymer coating as a nanofiller to enhance the corrosion resistance properties of the polymer coating. While nanoparticles such as carbon nanotubes (CNT) have been previously used in the art as nanofillers for preparing nanocomposites, carbon quantum dots are lower in cost to those nanoparticles. Furthermore, a relatively smaller amount of carbon quantum dots as a nanofiller must be added to a polymer to obtain a nanocomposite with similar properties compared to other nanofillers.

Thus, as discussed above, anti-corrosion coatings have increased in popularity due to the high costs associated with damages resulting from corrosion across various industries. The present disclosure is directed to an anti-corrosion coating and the method of fabrication thereof. Some benefits from these features may include, but are not limited to, providing a low-cost anti-corrosion coating with enhanced anti-corrosion properties. The following description provides details regarding such anti-corrosion coatings and their fabrication.

Preparation of an Anti-Corrosion Coating

Polymer coatings have been previously known and used for their anti-corrosion properties. Generally, before applying the polymer coating on a surface, a hardener may be introduced in to the polymer, in order to reinforce the polymer. According to one or more implementations of the present disclosure, quantum dots may be added to the polymer coating to enhance the properties of the anti-corrosion coating. Therefore, in one implementation, an anti-corrosion coating may include a polymer, a hardener, and quantum dots.

Figure 1:
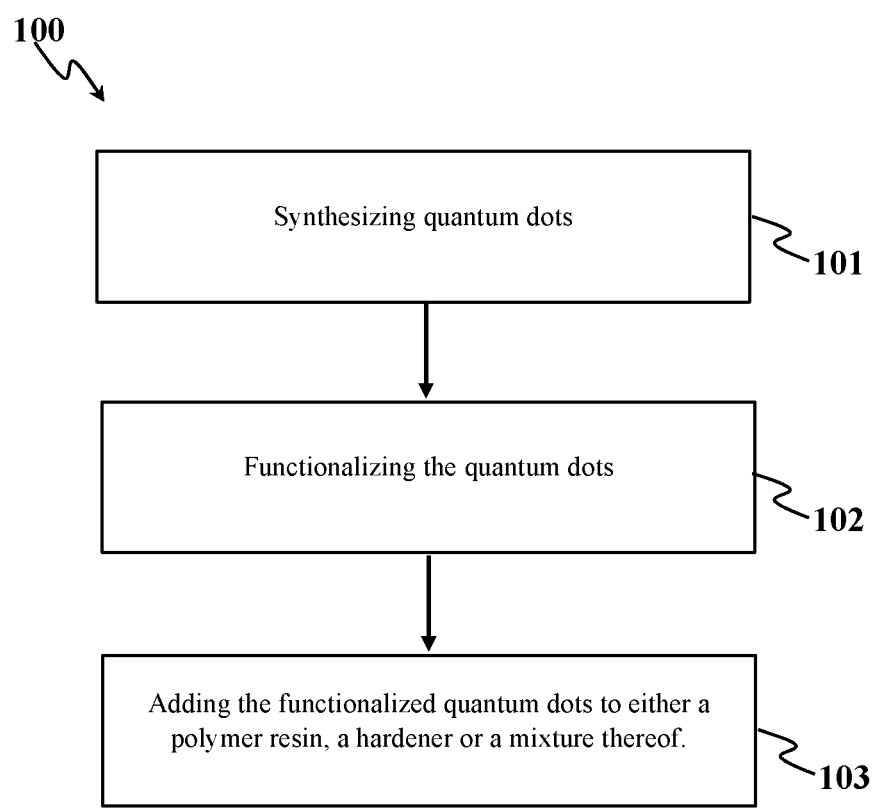
FIG. 1 is a flow chart illustrating a method of fabricating an anti-corrosion coating, according to one or more implementations of the present disclosure.

FIG. 1 is a flowchart depicting an implementation of a method of fabricating an anti-corrosion coating. As shown in FIG. 1, in one implementation, the method 100 includes a first step 101 of synthesizing quantum dots, a second step 102 of functionalizing the carbon quantum dots, and a third step 103 of adding the quantum dots to a polymer. Referring to first step 101, the quantum dots may be selected from the group consisting of carbon quantum dots, graphene quantum dots, polymer quantum dots, and/or combinations thereof, in which the quantum dots may be synthesized using top-down methods or bottom-up methods.

With respect to the first step 101, in some implementations, a method of fabricating or synthesizing carbon quantum dots ("carbon dots") may include a first step of preparing a first solution by dispersing carbon black in a $HNO_3$ solution. A second step may include refluxing the first solution for a predetermined amount of time and at a predetermined temperature; and a third step may include obtaining black sediments by evaporating the $HNO_3$ solution. A fourth step may include preparing a second solution by dispersing the black sediments in deionized water, and a fifth step may include obtaining carbon dots by drying the second solution at a predetermined temperature.

In another implementation, the method of fabricating carbon dots may include a first step of preparing a primary solution by dissolving citric acid and Urea in deionized water. A second step may include obtaining a carbon dot solution by placing the primary solution in an autoclave, and heating for a predetermined time. A third step may include obtaining carbon dots by drying the carbon dot solution.

Furthermore, in some implementations, the fabrication method of a carbon quantum dot nanocomposite may include the steps of, first, dispersing carbon dots in an appropriate aqueous or organic solvent with a concentration in the range of 0.0001 to 0.1 g/ml, using ultrasonic waves, in a predetermined time in the range of 0.5 to 2 hours, and second, adding the prepared dispersed carbon dots to a resin or hardener or a combination of the resin and hardener, and homogenizing the mixture using ultrasonic for a predetermined time in the range of 5 to 30 minutes, and then mechanically stirring for 15 to 60 minutes. In other implementations, other processes or techniques may be used to disperse the carbon dots or homogenizing the mixture. The as-prepared nanocomposite can be used as an anticorrosion nanocomposite coating by applying the prepared mixture on the surface and curing by heating. In other implementations, the nanocomposite coating can be mixed with and thereby include additives such as pigments, anti-foaming agents, dispersant additives, stabilizer additives, rheology modifiers and surfactants.

With respect to step 102, the quantum dots may be further functionalized for better dispersion in the polymer. The quantum dots may be functionalized with a functionalizing agent selected from the group consisting of silanes such as 3-aminopropyl triethoxysilane, 3-aminopropyl trimethoxysilane, 3-glycidiloxypropyl trimethoxysilane, bis [3 (triethoxysilyl) propyl] tetra sulfide, polyaniline, organic structures such as materials with amine end-groups and isocyanate end-groups, and combinations thereof.

In some implementations, the carbon dots may be functionalized with silane groups using precursors such as aminopropyl triethoxy silane (APTES), aminopropyl trimethoxysilane (APTMS), and glycidyl oxypropyltrimethoxysilane (GPTMS) or inorganic compounds such as titanium, alumina and silica. Furthermore, the carbon dots can be functionalized with organic compounds proportional to the structure of the resin or the hardener. For example, amine compounds may be used for functionalizing carbon-dots, for use in epoxy coatings; isocyanate compounds may be used for functionalizing carbon dots, for use in polyurethane coatings; and styrene compounds may be used for functionalizing carbon dots, for use in vinyl coatings.

In some other implementations, the carbon dots may be functionalized using 3-aminopropyl triethoxysilane (APTES). The functionalization process may include a first step of preparing a first solution by dissolving the carbon dot particles in deionized water. A second step may include preparing a second solution by adding the first solution to an APTES-toluene solution, and a third step may include refluxing the second solution to obtain a third solution. A fourth step may include obtaining functionalized carbon dots by washing and then drying the third solution.

With respect to the second step 103, in some implementations, adding the quantum dots to a polymer may include mixing a polymer with quantum dots and further adding the hardener to the polymer and quantum dots mixture. In other implementations, the method of adding the quantum dots include mixing the quantum dots with a hardener, and further adding the mixture of quantum dots and hardener to a polymer.

In some other implementations, adding the quantum dots to a polymer may include a first step of preparing a first solution by dispersing the carbon dots in an organic solvent such as ethanol, and a second step of preparing a second solution by adding the first solution to an epoxy resin or a curing agent. In one implementation, the solution of the first step may be added to a polyamide curing agent. A third step may include preparing a third solution by adding the second solution to a stoichiometric amount of epoxy resin, and a fourth step may include spray coating the third solution on a substrate and thereby obtaining a coated substrate.

The nanocomposite described herein includes polymers such as epoxy resins, polyurethane and acrylic with nanoparticles such as graphene, graphene oxide, carbon nanotubes to provide as anti-corrosion coatings, as well as the anti-corrosion properties of carbon dots (or other quantum dots). These nanocomposites provide an easier production method and lower production cost, particularly compared to other carbon nanostructures such as graphene, graphene oxide and carbon nanotubes. Furthermore the use of plant sources for the production of carbon dots facilitates the disclosed process, as well as the lower weight percent of carbon dots required for the fabrication of these nanocomposites.

Example 1: Fabrication of an Exemplar Solvent-Based Epoxy Coating

Figure 2A:
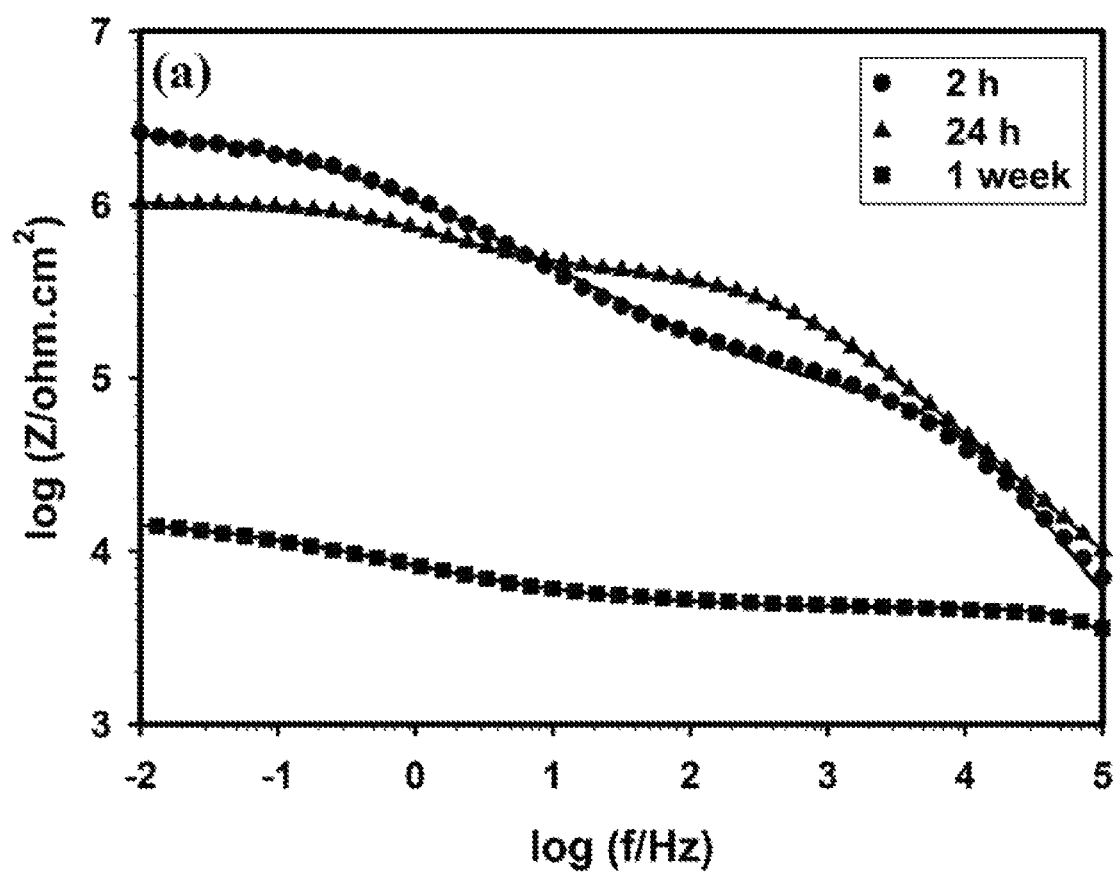
FIG. 2A depicts a Bode diagram presenting the electrochemical impedance spectroscopy (EIS) results of a pure epoxy coating.
Figure 2B:
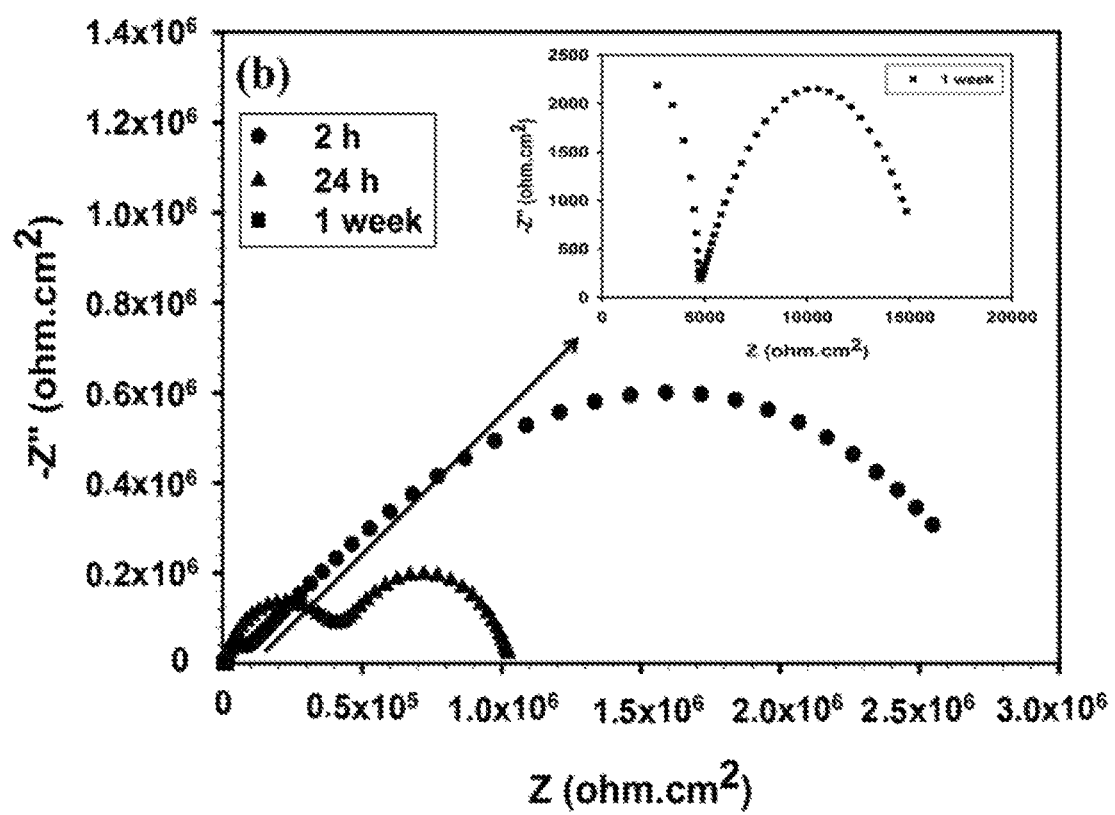
FIG. 2B depicts a Nyquist diagram presenting the electrochemical impedance spectroscopy (EIS) results of a pure epoxy coating.
Figure 3A:
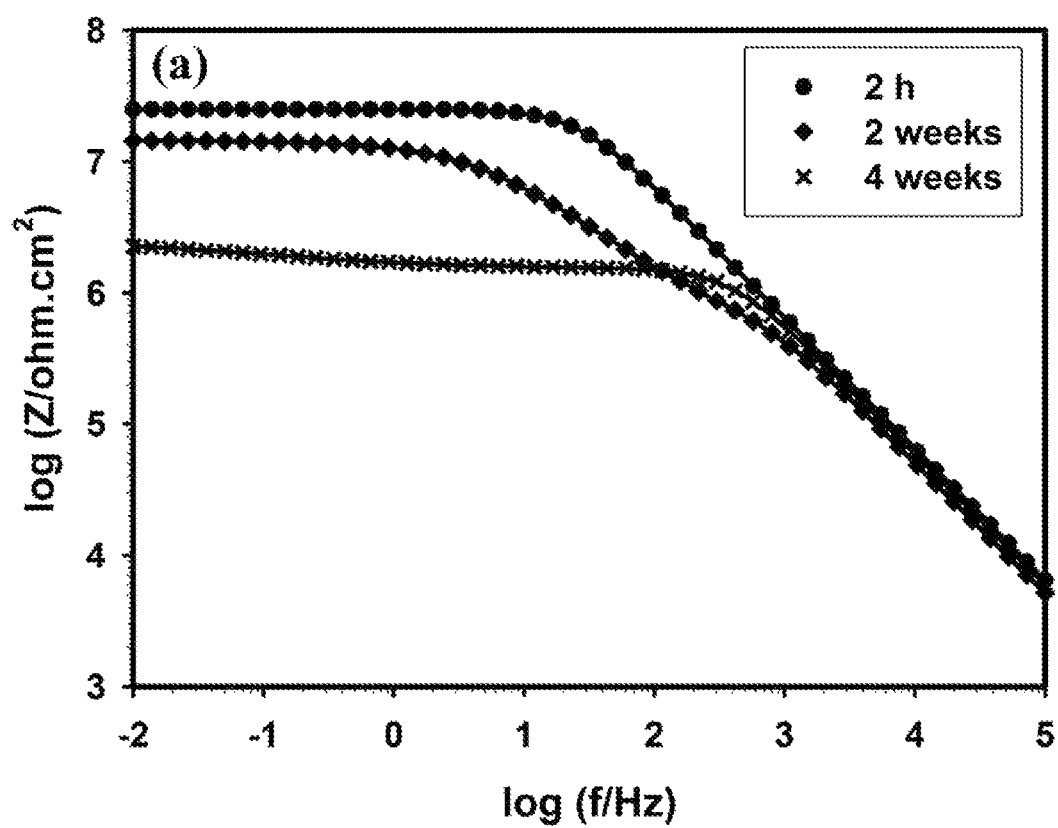
FIG. 3A depicts a Bode diagram presenting the electrochemical impedance spectroscopy (EIS) results of an implementation of an epoxy coating containing carbon dots with a concentration of 0.1 wt. %.
Figure 3B:
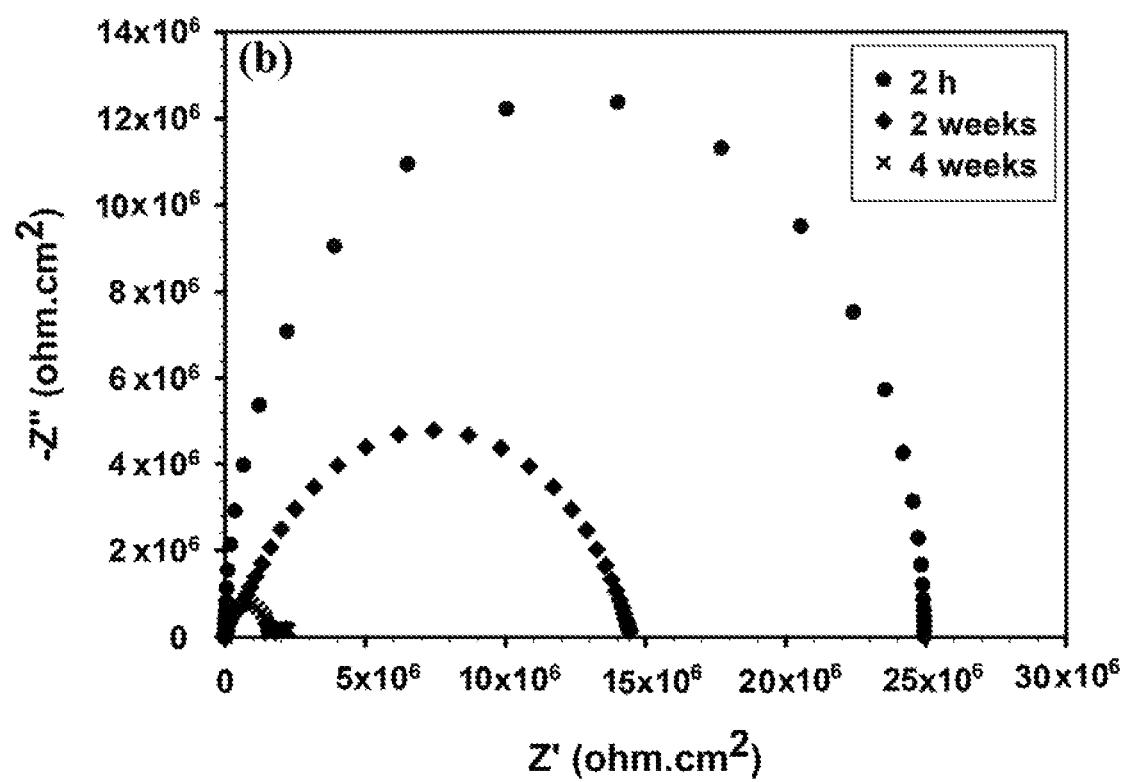
FIG. 3B depicts a Nyquist diagram presenting the electrochemical impedance spectroscopy (EIS) results of an implementation of an epoxy coating containing carbon dots with a concentration of 0.1 wt. %.
Figure 3C:
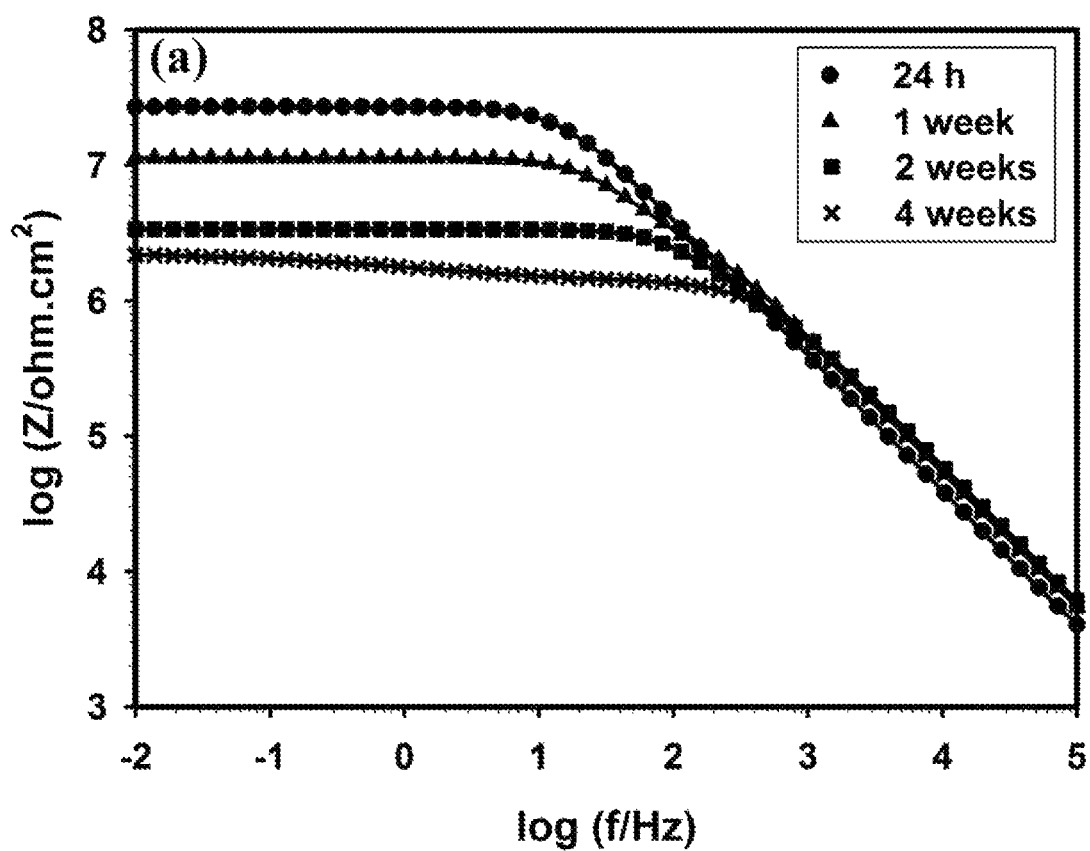
FIG. 3C depicts a Bode diagram presenting the electrochemical impedance spectroscopy (EIS) results of an implementation of an epoxy coating containing carbon dots with a concentration of 0.5 wt. %.
Figure 3D:
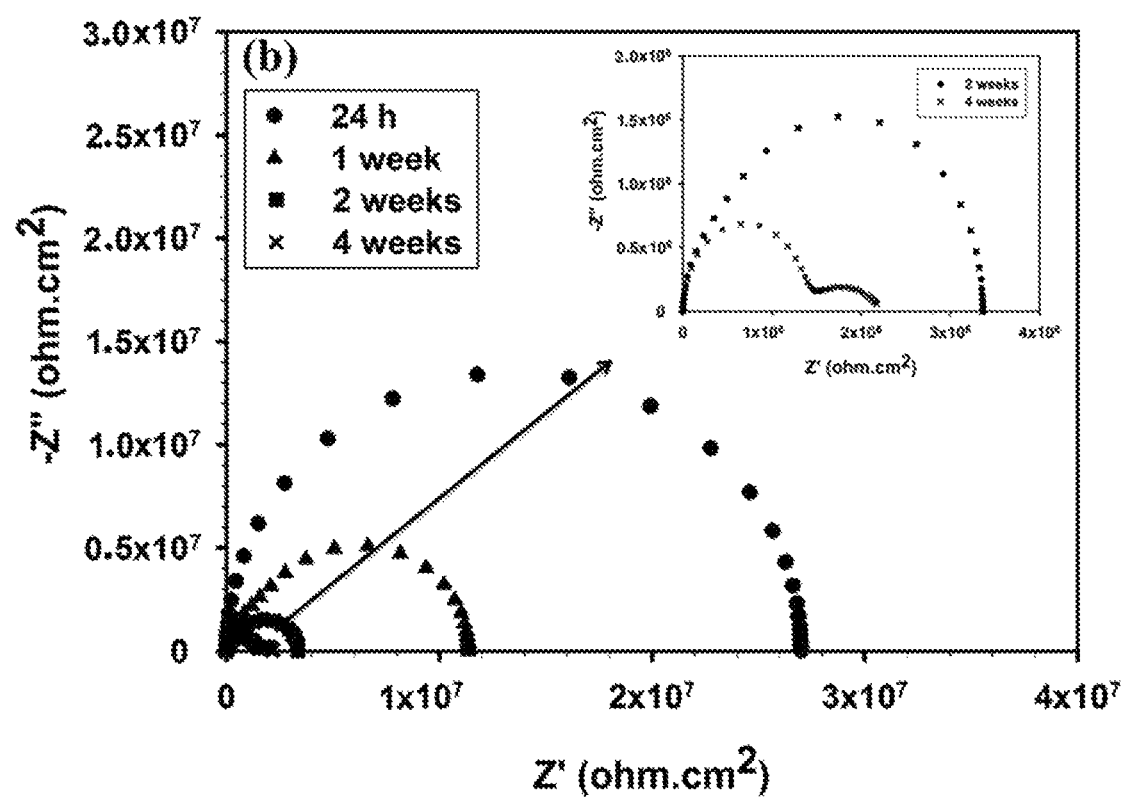
FIG. 3D depicts a Nyquist diagram presenting the electrochemical impedance spectroscopy (EIS) results of an implementation of an epoxy coating containing carbon dots with a concentration of 0.5 wt. %.

In Example 1, a corrosion resistant platform including a mild carbon steel substrate coated with pure solvent-based epoxy coatings was fabricated as a reference sample. This reference sample was further used for comparing the coatings fabricated according to the teachings of the present disclosure with an exemplar pure solvent-based epoxy coating. Fabrication of a pure solvent-based epoxy coating included a first step of mechanical mixing a bisphenol epoxy resin (Epon 1001, EEW=480-550) and a polyamide curing agent (Versamid 115, Amine value=230-246 mg KOH/gram resin) with a stoichiometric ratio. A second step included diluting the solution of the previous step using thinner, and a third step included spray coating a pre-treated mild carbon steel substrate, with the solution prepared in the second step to obtain a coated substrate. A fourth step included heat-treating the coated substrate at a temperature of approximately 90° C. for approximately 1 hour to obtain an exemplar pure solvent-based epoxy coating. Furthermore, for observing the properties of the pure solvent-based epoxy coating, characterization tests were applied. FIGS. 2A and 2B present the Bode and Nyquist plots of the exemplar pure epoxy sample after immersion in a 3.5 wt. % NaCl solution. As shown in FIGS. 2A and 2B, at a frequency of 0.01 Hz (|Z|0.01 Hz), the Z modulus for pure solvent-based epoxy coating in the initial immersion time was approximately $10^6$ $\Omega \cdot cm^2$. In addition, after immersion in the corrosive electrolyte for 1 week, |Z|0.01 Hz decreased to approximately $10^4$ $\Omega \cdot cm^2$, indicating complete degradation of the pure solvent-based epoxy coating.

Example 2: A Method of Fabricating Carbon Dots Using a Top-Down Approach and Using the as-Prepared Carbon Dots as a Filler in Solvent-Based Epoxy Coatings In Example 2, carbon dots were fabricated using a top-down approach, pursuant to the teachings of the present disclosure. In different implementations, the fabricated carbon dots may be further used as nanofillers in solvent-based epoxy coatings. In this method, carbon black was used as a precursor for carbon dot synthesis via a high yield method with an efficiency of approximately 80%. In this Example, the method of fabricating carbon dots included a first step of dispersing approximately 8 grams of carbon black in approximately 1500 milliliters of a $HNO_3$ solution, and a second step of refluxing the solution of the first step for approximately 24 hours at a temperature of approximately 135° C. A third step included evaporating the $HNO_3$ at a temperature of approximately 180° C. in an $N_2$ atmosphere, thereby obtaining light black sediments. In addition, a fourth step included re-dispersing the obtained light black sediments in deionized water, and centrifuging to remove the unoxidized and/or big carbon black particles, thereby obtaining a supernatant containing carbon dots. A fifth step included drying the supernatant at a temperature of 80° C. to obtain carbon dots which are herein after referred to as CD1.

In addition, the as-prepared CD1 was used as nanofiller insolvent-based epoxy coatings. Two different nanocomposite epoxy coatings containing CD1 with a concentration of 0.1 and 0.5 wt. % were prepared. For this purpose, CD1 particles were dispersed in an organic solvent such as ethanol with a concentration of approximately 1 gram of CD1 per 100 milliliters of ethanol (1 g/100 mL) via ultrasonic waves. The prepared solution of CD1 particles was added to either an epoxy resin or a curing agent. In some implementations, the CD1 solution may be poured into a polyamide curing agent and treated using ultrasonic waves to prepare a homogeneous dispersion of carbon dots in the curing agent. Then the mixture of polyamide hardener and CD1 particles was added to a stoichiometric amount of epoxy resin. After mechanically mixing the mixture of epoxy resin, polyamide hardener, and CD1 particles, the prepared composition was spray coated on a mild steel substrate and heat-treated at a temperature of approximately 90° C. for approximately 1 hour.

Infix. 5A and 5B, Bode and Nyquist diagrams presenting the electrochemical impedance spectroscopy (EIS) results of an epoxy coating containing carbon dots with a concentration of approximately 0.1 wt. % are provided. Similarly, FIGS. 5C and 5D provide Bode and Nyquist diagrams presenting the electrochemical impedance spectroscopy (EIS) results of an epoxy coating containing carbon dots with a concentration of approximately 0.5 wt. %. Referring to the sequence of FIGS. 5A to 5D, the |Z|0.01 Hz value for both nanocomposite coatings can be seen to be approximately $10^7$ $\Omega \cdot cm^2$ at the initial immersion time. The |Z|0.01 Hz value decreases gradually as the immersion time increases reaching a value of approximately $10^6$ $cm^2$ after 4 weeks of immersion in corrosive electrolyte, which demonstrates higher corrosion protection performance of the epoxy coatings containing carbon dots.

Example 3: A Method of Fabricating Carbon Dots Using a Bottom-Up Approach and Using the as-Prepared Carbon Dots as a Filler in Solvent-Based Epoxy Coatings In Example 3, carbon dots were fabricated using a top-down approach, pursuant to the teachings of the present disclosure. The fabricated carbon dots were further used as nanofillers in solvent-based epoxy coatings. A hydrothermal method is one of the more common and high yield methods for production of carbon dots, utilizing citric acid and urea as precursors. The hydrothermal method is a facile and low-cost method for synthesis of carbon dots, with negligible energy consumption, in which the final product is synthesized in one step with high selectivity.

For synthesis of carbon dots, approximately 5.04 grams of citric acid and approximately 4.32 grams of urea (a citric acid:urea ratio of about 5:4.3) were dissolved in approximately 180 milliliters of deionized water, to obtain a first solution. The first solution was then magnetically stirred to prepare a homogeneous solution. Then the homogeneous solution was transferred into a Teflon-lined autoclave, and the sealed autoclave was placed in an electric oven at a temperature of approximately 160° C. for approximately 4 hours, to obtain a solution containing carbon dots. The solution containing carbon dots was dried in an oven at a temperature of approximately 80° C. to obtain carbon dots which are hereinafter referred to as CD2.

Furthermore, the as-prepared CD2 sample was functionalized using 3-aminopropyl triethoxysilane (APTES) which is hereinafter referred to as f-CD2. The functionalization process of CD2 sample included a first step of dissolving the CD2 particles in deionized water (0.001 g/mL), followed by a second step of stirring the solution of the first step to prepare a homogeneous solution. A third step included adding the solution of the second step to an APTES-toluene solution, followed by a fourth step of stirring the mixture obtained in the third step for approximately 24 hours. A fifth step included refluxing the solution obtained in the fourth step at a temperature of approximately 70-80° C. for approximately 24 hours. A sixth step included washing the product of the fifth step with deionized water and ethanol and a seventh step included drying the product of the sixth step at a temperature of approximately 50° C. to obtain a f-CD2 sample.

Furthermore, nanocomposite epoxy coatings containing f-CD2 with a concentration of 0.1 and 0.5 wt. % were fabricated. The method of fabricating nanocomposite epoxy coatings included a first step of dispersing f-CD2 particles in an organic solvent such as butyl glycol with a concentration of 1 gram f-CD2 per 100 milliliters of methanol (1 g/100 mL) via ultrasonic waves. A second step included adding the prepared solution of f-CD2 particles of the first step to an epoxy resin and/or curing agent. In one implementation, the f-CD2 solution may be added to a polyamide curing agent and treated via ultrasonic waves to prepare a homogeneous dispersion of carbon dots in the curing agent. A third step involved adding the mixture of polyamide hardener and f-CD2 particles to a stoichiometric amount of epoxy resin. A fourth step included mechanically mixing the mixture of epoxy resin, polyamide hardener, and f-CD2 particles to obtain a f-CD2 mixture, and a fifth step included spray coating the f-CD2 mixture on a mild steel substrates and heating at approximately 90° C. for approximately 1 hour.

Figure 4A:
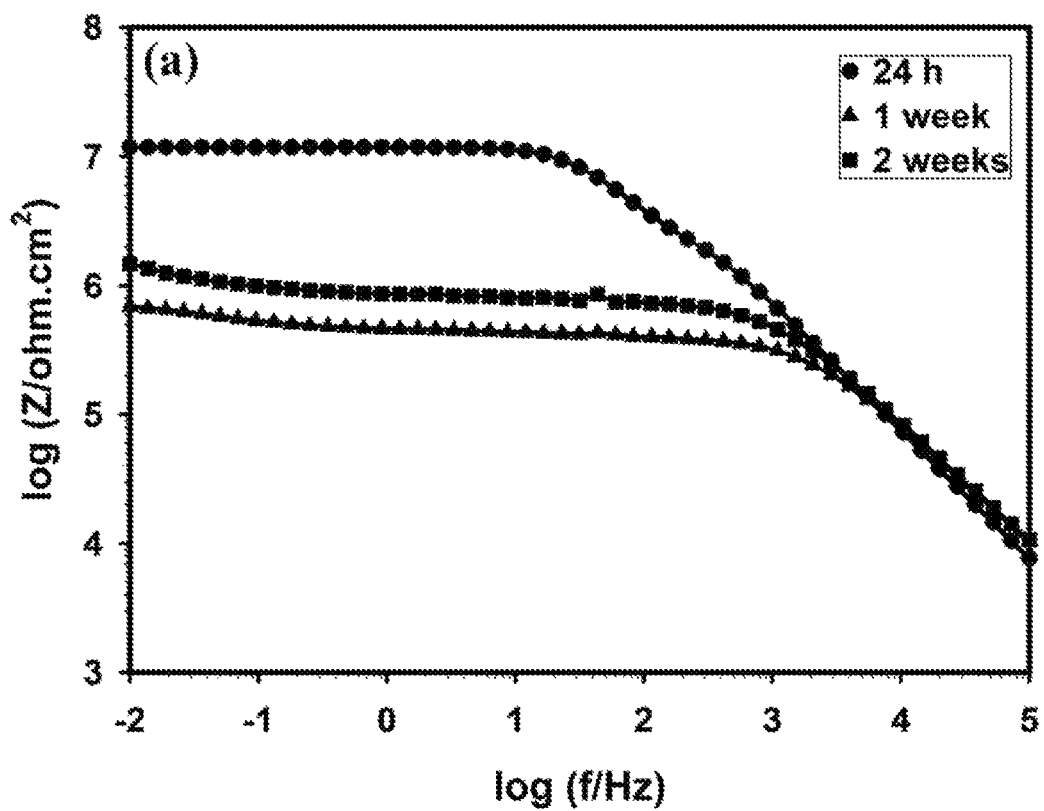
FIG. 4A depicts a Bode diagram presenting the electrochemical impedance spectroscopy (EIS) results of an epoxy coating containing functionalized carbon dots with a concentration of 0.1 wt. %, according to one or more implementations of the present disclosure.
Figure 4B:
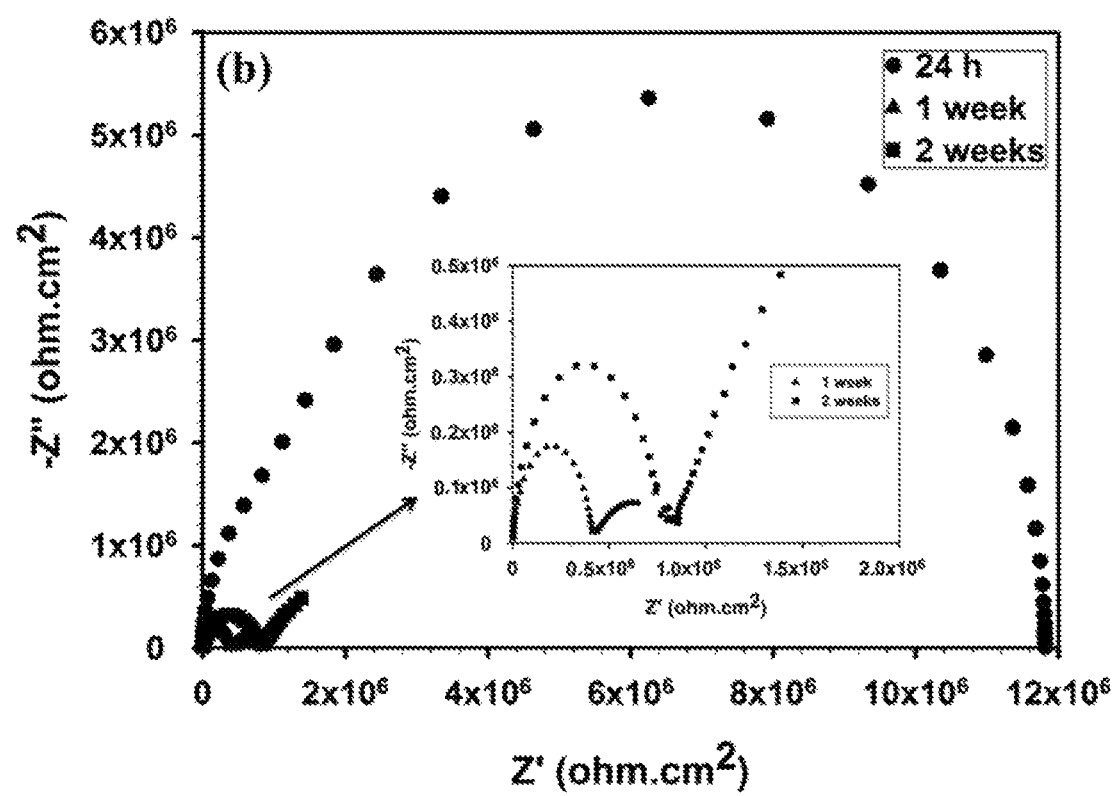
FIG. 4B depicts a Nyquist diagram presenting the electrochemical impedance spectroscopy (EIS) results of an epoxy coating containing functionalized carbon dots with a concentration of 0.1 wt. %, according to one or more implementations of the present disclosure.
Figure 4C:
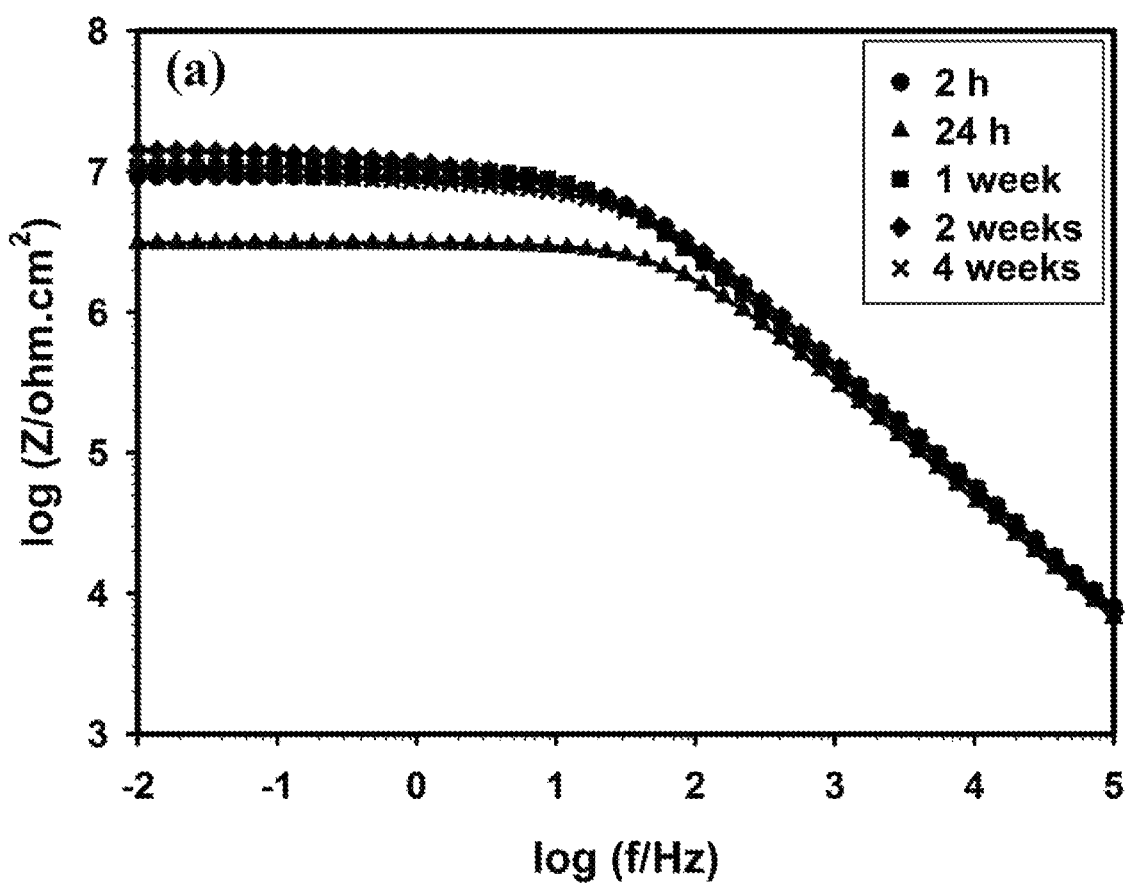
FIG. 4C depicts a Bode diagram presenting the electrochemical impedance spectroscopy (EIS) results of an epoxy coating containing functionalized carbon dots with a concentration of 0.5 wt. %, according to one or more implementations of the present disclosure.
Figure 4D:
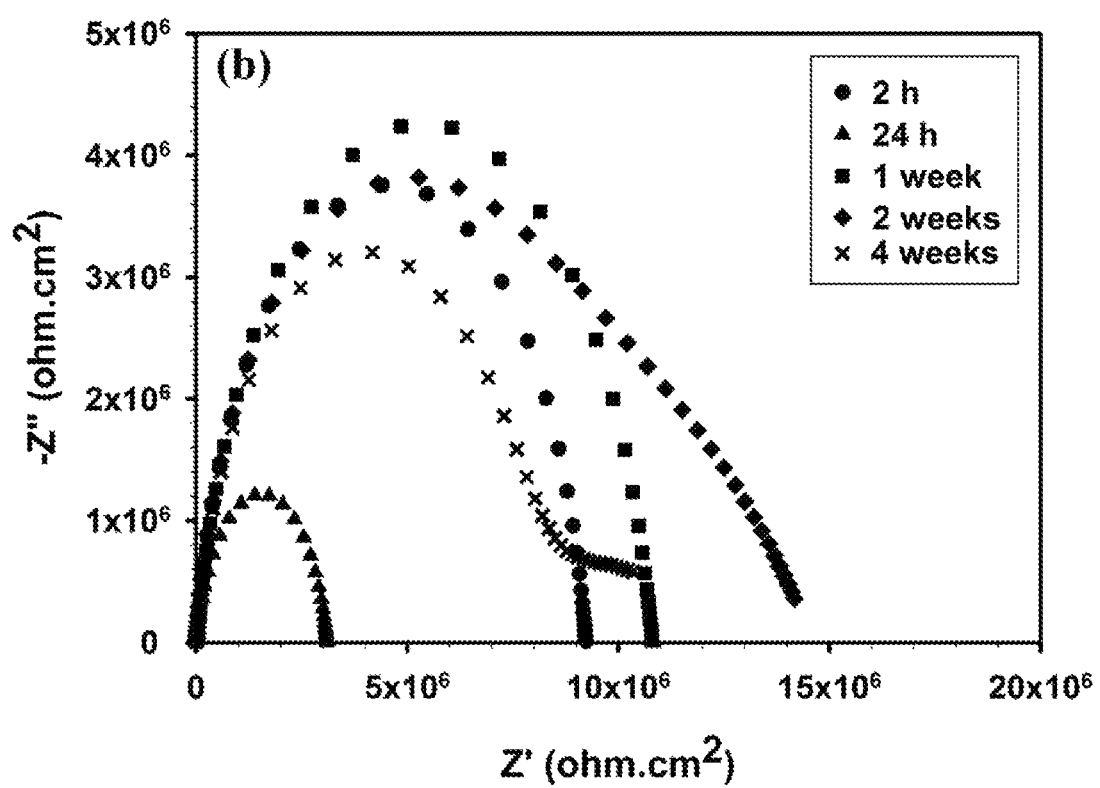
FIG. 4D depicts a Nyquist diagram presenting the electrochemical impedance spectroscopy (EIS) results of an epoxy coating containing functionalized carbon dots with a concentration of 0.5 wt. %, according to one or more implementations of the present disclosure.

FIGS. 4A and 4B show the Bode and Nyquist diagrams presenting the electrochemical impedance spectroscopy (EIS) results of an epoxy coating containing functionalized carbon dots with a concentration of approximately 0.1 wt. %, according to one or more implementations of the present disclosure. In addition, FIGS. 4C and 4D show the Bode and Nyquist diagrams presenting the electrochemical impedance spectroscopy (EIS) results of an epoxy coating containing functionalized carbon dots with a concentration of 0.5 wt. %, according to one or more implementations of the present disclosure. Referring to the sequence of FIGS. 4A to 4D, the |Z|0.01 Hz values for the as-prepared nanocomposite coatings can be seen to be higher than the prepared pure epoxy sample shown in FIGS. 2A and 2B, indicating the improved barrier performance of the as-prepared nanocomposite coatings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 201, 202, or 203 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method of fabricating an anti-corrosion coating, the method comprising:
synthesizing quantum dots; and
adding the synthesized quantum dots to a polymer, comprising:
preparing a first solution by dispersing the quantum dots in ethanol with a concentration of the quantum dots to the ethanol equal to 1 gram of the quantum dots to 100 milliliters of ethanol via ultrasonic waves;
preparing a second solution by adding the first solution to a polymide curing agent; and
preparing a third solution by adding the second solution to a stoichiometric amount of epoxy resin.

2. The method according to claim 1, further comprising functionalizing the quantum dots.

3. The method according to claim 1, wherein the quantum dots include carbon quantum dots.

4. The method according to claim 2, wherein functionalizing the quantum dots, comprises:
obtaining a first functionalized solution by dissolving the quantum dots in deionized water to obtain a first solution;
obtaining a second functionalized solution by adding the first functionalized solution to a solution containing a functionalizing agent;
obtaining a refluxed solution by refluxing the second functionalized solution; and
obtaining functionalized quantum dots by drying the refluxed solution.

5. The method according to claim 4, wherein the functionalizing agent includes silanes.

6. The method according to claim 4, wherein the functionalizing agent is a silane selected from the group consisting of 3-aminopropyl triethoxysilane, 3-aminopropyl trimethoxysilane, 3-glycidiloxypropyl trimethoxysilane, and bis[3(triethoxysilyl)propyl] tetra sulfide.

7. The method according to claim 1, further comprising:
obtaining a coated substrate by spray coating the third solution on a substrate.

8. An anti-corrosion coating manufactured by the method of claim 1.

* * * * *